(No Model.) 3 Sheets—Sheet 1.

M. BADONI.
LOCK.

No. 504,292. Patented Aug. 29, 1893.

Witnesses:
J. Staib
Harold Serrell

Inventor:
Massimiliano Badoni
per Lemuel W. Serrell
Atty.

(No Model.)  3 Sheets—Sheet 2.
M. BADONI.
LOCK.
No. 504,292. Patented Aug. 29, 1893.
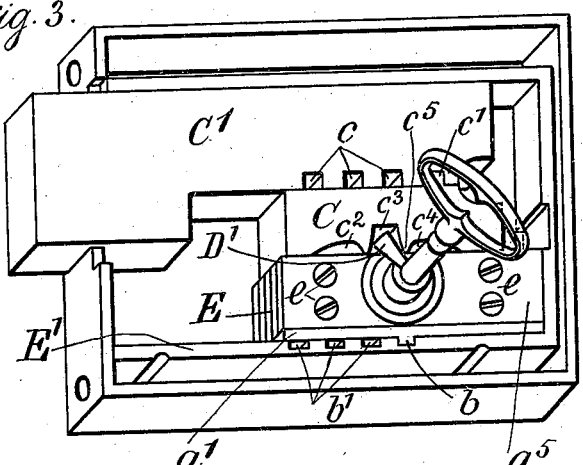
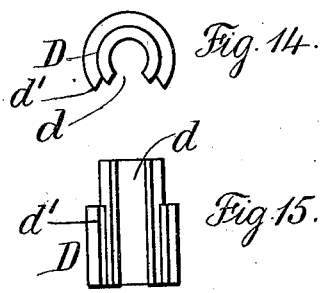
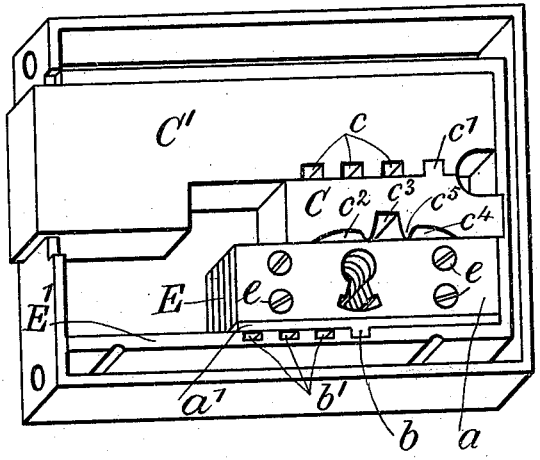
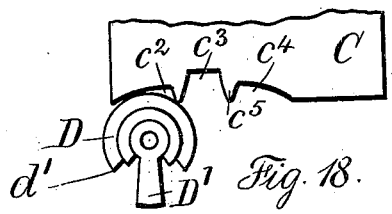
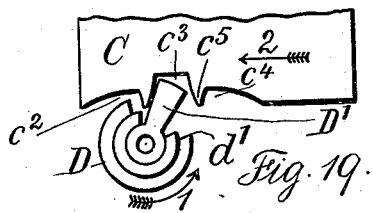
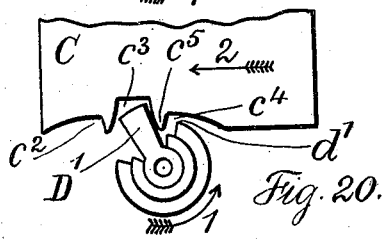
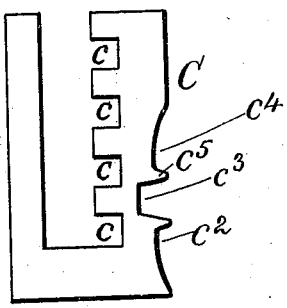
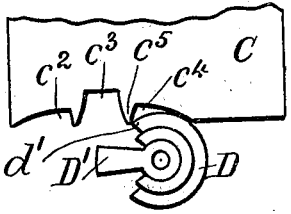
Witnesses
J. Staib
Harold Serrell
Inventor:
Massimiliano Badoni
per Lemuel W. Serrell
Atty.

(No Model.) 3 Sheets—Sheet 3.
M. BADONI.
LOCK.
No. 504,292. Patented Aug. 29, 1893.
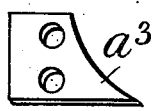
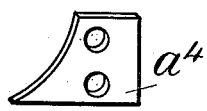
Fig. 8.
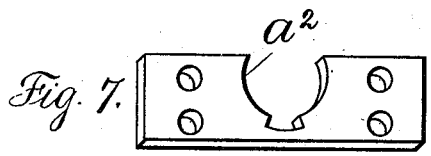
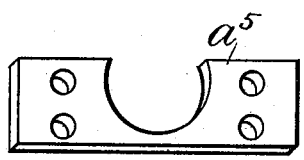
Fig. 7. Fig. 9.
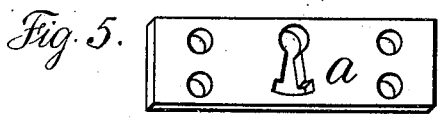
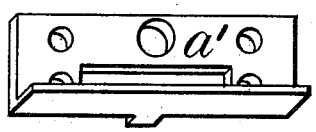
Fig. 5. Fig. 6.
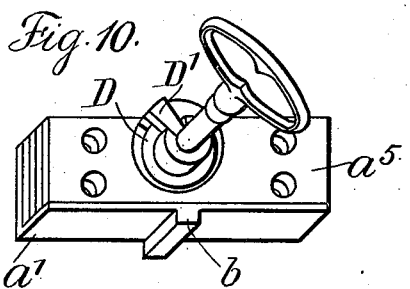
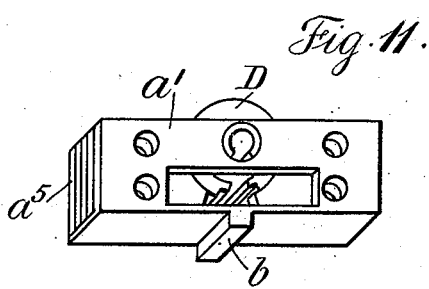
Fig. 10. Fig. 11.
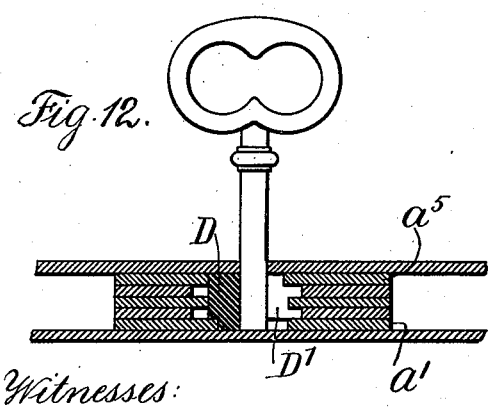
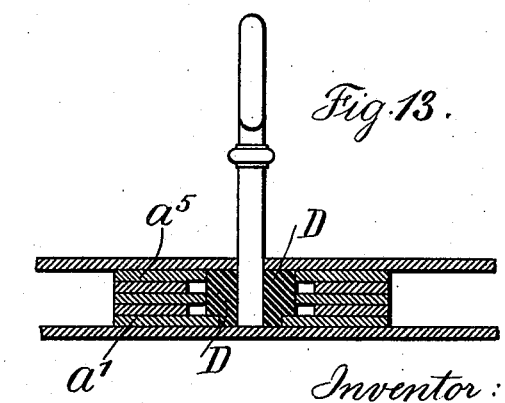
Fig. 12. Fig. 13.
Witnesses:
J. Stait
Harold Serrell
Inventor:
Massimiliano Badoni
per Lemuel W. Serrell Atty

UNITED STATES PATENT OFFICE.

MASSIMILIANO BADONI, OF GENEVA, SWITZERLAND, ASSIGNOR TO THE ALOYS REVILLIOD DE MURALT, OF SAME PLACE.

LOCK.

SPECIFICATION forming part of Letters Patent No. 504,292, dated August 29, 1893.

Application filed June 22, 1892. Serial No. 437,552. (No model.)

*To all whom it may concern:*

Be it known that I, MASSIMILIANO BADONI, mechanician, of Geneva, Switzerland, have invented certain new and useful Improvements in Locks, of which the following is a specification.

In carrying out my invention I employ a sliding bolt and an auxiliary bolt head adjustable in its relation to said bolt, and these parts are moved by the key and are held in their several positions by the key cylinder which engages notches on one edge of the bolt. I also employ a number of superposed plates that receive the said key and key cylinder in position for their operation and which act to prevent the lock being operated except by a key with wards fitting the openings in said plates, all as hereinafter more fully described.

Figure 2:
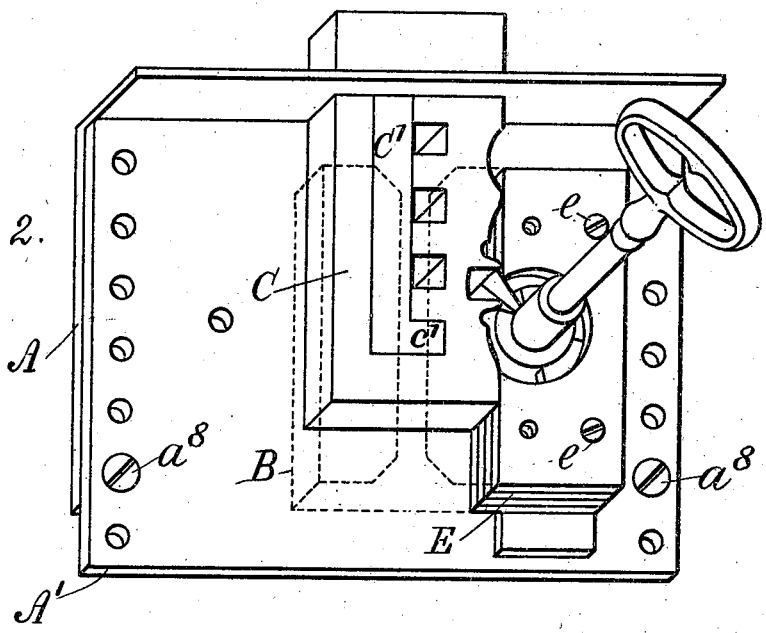
Figure 1:
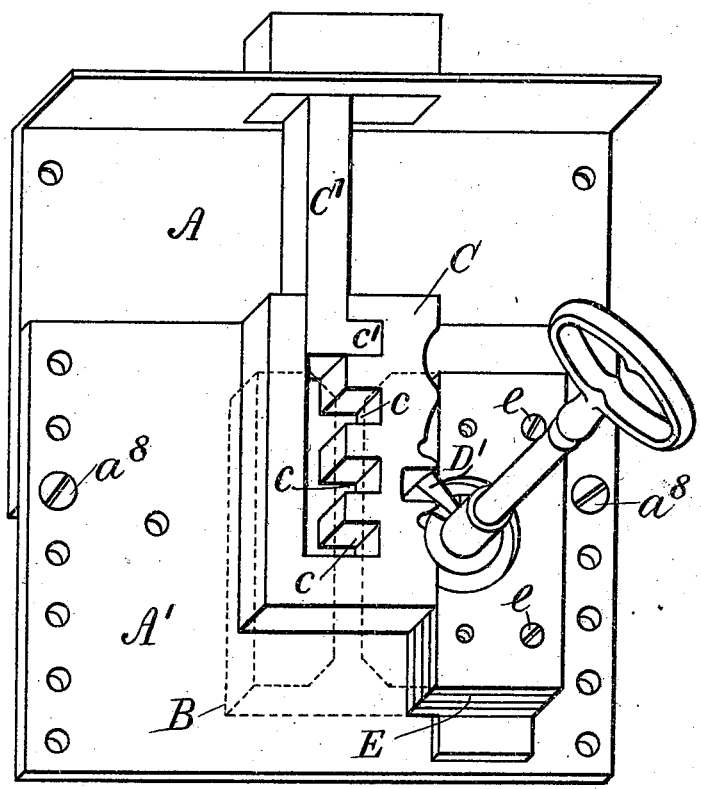

In the accompanying drawings, Figure 1 is a plan view of the lock mechanism with the bolt and bolt head adjusted in their longest relation. Fig. 2 is a plan view of the lock mechanism with the bolt and bolt head adjusted to their shortest relation. Figs. 3 and 4 illustrate by plan views a slightly modified form of lock. Figs. 5 to 9 inclusive show the ward plates of the combination separately. Figs. 10 and 11 are perspective obverse and reverse views of the superposed plates and the key cylinder separate from the lock. Figs. 12 and 13 are sectional views of said superposed plates and key cylinder. Fig. 14 is a plan of the key cylinder D. Fig. 15 is an elevation of the key cylinder D. Fig. 16 is an inverted plan of the key cylinder D. Figs. 17 to 20 inclusive show four different positions of the key cylinder D in its operative engagement with the bolt C. Fig. 21 is a plan of the bolt C alone.

In all the figures the same letters of reference refer to the same parts.

To an adjustable plate A there is secured a plate A' and box B, shown by dotted lines. This box acts as a guide for the bolt C in its forward and backward movement. The bolt is composed of the main portion C and the bolt head C', said bolt head being adjustable in a slot of the bolt C and being provided with a projection $c'$ engaging one of the recesses $c$ of the bolt C, the bolt and bolt head thus being adjustable in their relation to each other without any screw, according as the plates A and A' of the casing are lengthened or shortened and secured in their relation to each other by means of the screws $a^8 a^8$.

A key cylinder D (Figs. 14, 15 and 16) is provided with a slot $d$ for the bit of the key.

The bolt C is provided with notches $c^3 c^3$ and $c^4$ with intervening talons and these are engaged by the key D' and the key cylinder D, as shown in Figs. 17 to 20 inclusive. The circumference of the key cylinder D engages the notch $c^2$ as shown in Fig. 18, and in this position the bolt cannot be thrown backward until the key cylinder D is rotated in the direction of the arrow 1 by means of the key D', as shown in Figs. 19 and 20. The bit of said key engaging the notch $c^3$ bears against the talon and causes the bolt C to be shifted in the direction of the arrow 2 (Fig. 19) and this motion is continued by the edge $d'$ of the cylinder D engaging with the talon or projection $c^5$ of the bolt C (Figs. 19 and 20). The bolt C is thus moved along into its unlocking position (Fig. 20) where the circumference of the key cylinder engages the notch $c^4$ of the bolt C and the latter is secured in this position and cannot be shifted out of it except by the key being inserted and turned in the opposite direction. The key cylinder D is located in a combination of superposed plates E the number of which may vary according to the degree of security which the lock is intended to afford. In the drawings I have shown plates $a$ $a'$ $a^2$ $a^3$ $a^4$ and $a^5$ which are connected with one another and preferably to the plate A' by means of screws $e e$. The bit or wards of the key D' must be formed so as to be capable of revolving in the opening formed in the said plates when superposed as shown in Figs. 1, 2, 3, 4, 10, 11, 12 and 13. These plates can be interchanged in different locks and the wards of the key made to fit and conform thereto.

In the modification shown in Figs. 3 and 4, the bolt C is made with a projection $c'$ and the edge of the bolt head C' with notches into one of which the projection $c'$ is received in adjusting the relative positions of the said parts, and the collection of superposed plates E is provided with a projection $b$ adapted to engage notches $b'$ in the surface of a frame E'. This provides for an adjustment of the superposed plates lengthwise of the lock to accommodate the relation of the bolt C to the bolt head C', so that the parts may be operated in their various relations.

Having thus fully described my invention, I claim—

1. The combination in a lock with the bolt head C'; of the bolt C having notches $c^2$ $c^3$ and $c^4$ and with intermediate talons, the key D' and the cylinder D entering said notches and engaging the talons, substantially as shown and described.

2. The combination in a lock, of the bolt head C' having a projection $c'$, the bolt C having recesses $c$ adapted to receive the projections $c'$ for varying the position of the bolt head to the bolt, means for actuating the bolt in locking and unlocking, the plate A' and the box or guide connected together, and the plate A through which the bolt head passes, and screws for connecting the plates A and A', there being holes that allow the screws to be inserted after the plates have been placed in their proper relative positions, substantially as set forth.

3. The combination in a lock, of a bolt C slotted and having recesses, a bolt head C' having a stem in the bolt slot and a projection $c'$ engaging either one of the recesses $c$, and means for projecting and retracting the bolt, substantially as and for the purposes set forth.

4. The combination in a lock, with the bolt and key; of the key cylinder D provided with a slot $d$ for the key, and the superposed plates connected together and notched to receive the cylinder and key, substantially as set forth.

In testimony whereof I have signed my name to this specification in the presence of two subscribing witnesses.

MASSIMILIANO BADONI.

Witnesses:
E. IMER-SCHNEIDER,
A. REVILLIOD DE MURALT.